United States Patent
Hayakawa et al.

(10) Patent No.: US 10,457,228 B2
(45) Date of Patent: Oct. 29, 2019

(54) CABLE AND WIRE HARNESS

(71) Applicant: Hitachi Metals, Ltd., Tokyo (JP)

(72) Inventors: Yoshikazu Hayakawa, Hitachi (JP);
Tomoyuki Murayama, Hitachi (JP);
Hirotaka Eshima, Hitachi (JP);
Takahiro Futatsumori, Mito (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/377,654

(22) Filed: Apr. 8, 2019

(65) Prior Publication Data
US 2019/0232893 A1  Aug. 1, 2019

Related U.S. Application Data

(63) Continuation of application No. 15/615,362, filed on Jun. 6, 2017, now Pat. No. 10,315,590.

(30) Foreign Application Priority Data

Jun. 14, 2016  (JP) .................. 2016-117724
Jun. 14, 2016  (JP) .................. 2016-117726

(51) Int. Cl.
*F16L 3/06* (2006.01)
*H01B 11/04* (2006.01)
(Continued)

(52) U.S. Cl.
CPC ............ *B60R 16/0207* (2013.01); *F16L 3/06* (2013.01); *H01B 7/0045* (2013.01); *H01B 11/04* (2013.01); *H02G 3/0481* (2013.01)

(58) Field of Classification Search
CPC ..... B60R 16/0207; F16L 3/06; H01B 7/0045; H01B 11/04; H02G 3/0481
(Continued)

(56) References Cited

U.S. PATENT DOCUMENTS 2,883,314 A * 4/1959 Martin ................. H01B 13/268
156/155
3,019,285 A * 1/1962 Delutis .................. H01B 7/282
156/56
(Continued)

FOREIGN PATENT DOCUMENTS

JP  2014135153 A  7/2014

OTHER PUBLICATIONS

DuPont™ Nomex®410 Technical Data Sheet Apr. 26, 2016.

*Primary Examiner* — Timothy J Thompson
*Assistant Examiner* — Michael F McAllister
(74) *Attorney, Agent, or Firm* — Roberts Mlotkowski Safran Cole & Calderon P.C.

(57) ABSTRACT

A cable includes a plurality of electric wires, and a tape member spirally wound around an assembled article that is formed by twisting the plurality of electric wires. The thickness of the tape member is not less than 0.028 mm and not more than 0.090 mm, a width of the tape member is not less than 18 mm and not more than 35 mm, the tape member is spirally wound with an overlap of not less than ¼ and not more than ½ of the width thereof, and a tensile strength of the tape member is different between the longitudinal direction and the width direction and is smaller in the width direction than in the longitudinal direction.

15 Claims, 6 Drawing Sheets

(51) Int. Cl.
  *B60R 16/02* (2006.01)
  *H01B 7/00* (2006.01)
  *H02G 3/04* (2006.01)

(58) Field of Classification Search
  USPC .................................................... 174/72 A
  See application file for complete search history.

(56) References Cited

U.S. PATENT DOCUMENTS

| | | | | |
|---|---|---|---|---|
| 3,571,490 A | * | 3/1971 | Bunish | H01B 7/295 |
| | | | | 174/113 R |
| 3,756,004 A | * | 9/1973 | Gore | H01B 13/0003 |
| | | | | 242/441.2 |
| 3,823,255 A | * | 7/1974 | La Gase | H01B 7/295 |
| | | | | 174/113 R |
| 4,150,249 A | * | 4/1979 | Pedersen | H01B 7/295 |
| | | | | 174/36 |
| 4,151,366 A | * | 4/1979 | Betts | H01B 7/295 |
| | | | | 174/110 B |
| 4,498,282 A | * | 2/1985 | Graetz | D07B 1/148 |
| | | | | 116/200 |
| 5,106,686 A | | 4/1992 | Wade, Jr. et al. | |
| 5,216,202 A | * | 6/1993 | Yoshida | H01B 7/182 |
| | | | | 174/106 R |
| 5,636,551 A | * | 6/1997 | Davidson | D07B 1/162 |
| | | | | 29/434 |
| 6,559,385 B1 | * | 5/2003 | Johnson | H01B 5/105 |
| | | | | 174/126.1 |
| 7,495,175 B2 | | 2/2009 | Pluister | |
| 7,534,962 B2 | | 5/2009 | Scheel et al. | |
| 9,117,573 B2 | | 8/2015 | Mclane et al. | |
| 9,221,407 B2 | | 12/2015 | Hayakawa | |
| 9,502,871 B2 | * | 11/2016 | Eshima | B60R 16/0215 |
| 9,511,726 B2 | | 12/2016 | Hayakawa | |
| 2010/0129650 A1 | * | 5/2010 | Mayan | C09J 7/21 |
| | | | | 428/339 |
| 2012/0193122 A1 | * | 8/2012 | Sugiyama | H01B 11/183 |
| | | | | 174/113 R |
| 2012/0238172 A1 | * | 9/2012 | Siebert | B32B 5/022 |
| | | | | 442/334 |
| 2014/0190741 A1 | | 7/2014 | Hayakawa | |
| 2015/0325337 A1 | * | 11/2015 | McCullough | H01B 7/14 |
| | | | | 174/113 R |
| 2016/0068119 A1 | | 3/2016 | Hayakawa | |
| 2016/0300642 A1 | * | 10/2016 | Kodama | H01B 3/307 |

\* cited by examiner

CABLE AND WIRE HARNESS

The present application is a Continuation Application under 35 USC § 120 of U.S. application Ser. No. 15/615,362, filed Jun. 6, 2017, which is based on Japanese patent application Nos. 2016-117726 and 2016-117724 filed on Jun. 14, 2016, the entire contents of which are incorporated herein by reference.

BACKGROUND OF THE INVENTION

1. Field of the Invention

The invention relates to a cable and a wire harness, in particular, to a cable and a wire harness which are used in a vehicle such as automobile for connection between a wheel side and a vehicle body side.

2. Description of the Related Art

In recent years, electrically operated brake units are used in vehicles such as automobiles.

Electro-mechanical brakes (EMB) and electric parking brakes (EPB) are known as such electrically operated brake units.

The electro-mechanical brakes, also simply called electric friction brake or electric brake, are configured that a rotational drive force of a dedicated electric motor mounted on each wheel of a vehicle is controlled according to the operation amount (tread force or displacement amount) of a brake pedal by a driver, so that a piston driven by the electric motor presses brake pads against a disc rotor of the wheel to generate a braking force intended by the driver.

The electric parking brakes are configured that a dedicated electric motor provided on each wheel of a vehicle is driven based on an operation performed on a parking brake activation switch by a driver after stopping a vehicle, so that a piston driven by the electric motor presses brake pads against a disc rotor of the wheel to generate a braking force.

Also, in recent years, sensors, e.g., ABS (Anti-lock Brake System) sensor for detecting the speed of a wheel rotation during motion, air pressure sensor for detecting air pressure of a tire and temperature sensor, etc., are often mounted on wheels of vehicles.

Accordingly, the wheel side and the vehicle body side are connected through cables in which a signal line for a sensor mounted on a wheel and/or a signal line for controlling an electro-mechanical brake and a power line for supplying power to an electric motor of electro-mechanical brake or electric parking brake are housed in one sheath. Such cables with connectors integrally provided at end portions are wire harnesses.

JP-A-2014-135153 discloses a cable in which a lubricant such as talc powder is interposed between plural electric wires and a sheath covering all the plural electric wires together so that friction between the electric wires and the sheath is reduced to reduce stress applied to the electric wires when being bent and flex resistance is thereby improved.

SUMMARY OF THE INVENTION

The cable disclosed by JP-A-2014-135153 has a problem that a lubricant such as talc powder may be scattered in a workplace when terminating the cable, leading to deterioration of the working environment.

It is an object of the invention to provide a cable and a wire harness which can prevent deterioration of working environment during cable termination while maintaining flex resistance.

[1] According to an embodiment of the invention, a cable comprises:
a plurality of electric wires; and
a tape member spirally wound around an assembled article that is formed by twisting the plurality of electric wires,
wherein the thickness of the tape member is not less than 0.028 mm and not more than 0.090 mm, a width of the tape member is not less than 18 mm and not more than 35 mm, the tape member is spirally wound with an overlap of not less than ¼ and not more than ½ of the width thereof, and a tensile strength of the tape member is different between the longitudinal direction and the width direction and is smaller in the width direction than in the longitudinal direction.

[2] According to another embodiment of the invention, a cable comprises:
a plurality of electric wires;
a tape member spirally wound around an assembled article that is formed by twisting the plurality of electric wires; and
a sheath covering the tape member,
wherein surface roughness of the tape member is different between a surface on the assembled article side and a surface on the sheath side, and the surface on the sheath side has a larger surface roughness than the surface on the assembled article side.

[3] According to another embodiment of the invention, a wire harness comprises: the cable described in [1] or [2]; and a connector attached to at least one of end portions of the electric wires.

According to one embodiment of the invention, a cable and a wire harness can be provided that can prevent deterioration of working environment during cable termination while maintaining flex resistance.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment

An embodiment of the invention will be described below in conjunction with the appended drawings.

Description of Vehicle in which Cable is Used

Figure 1:
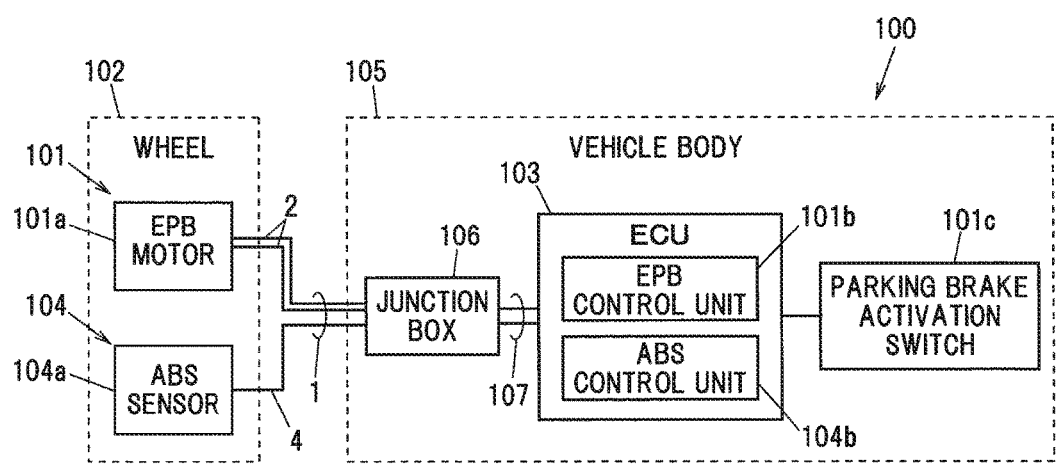
FIG. 1 is a block diagram illustrating a configuration of a vehicle in which a cable in an embodiment of the present invention is used.

FIG. 1 is a block diagram illustrating a configuration of a vehicle in which a cable in the present embodiment is used.

As shown in FIG. 1, a vehicle 100 is provided with an electric parking brake (hereinafter, referred to as "EPB") 101 as an electrically operated brake unit.

The EPB 101 is provided with an EPB motor 101a and an EPB control unit 101b.

The EPB motor 101a is a wheel-side device mounted on a wheel 102 of the vehicle 100. The EPB control unit 101b is mounted on an ECU (electronic control unit) 103 which is a vehicle body-side device of the vehicle 100. Alternatively, the EPB control unit 101b may be mounted on a control unit other than the ECU 103, or may be mounted on a dedicated hardware unit.

The EPB motor 101a is provided with a piston to which brake pads are attached even though it is not illustrated, and it is configured that the piston moved by rotary drive of the EPB motor 101a presses the brake pads against a disc rotor of a wheel (the wheel 102) to generate a braking force. A pair of first electric wires 2 as power lines is connected to the EPB motor 101a to supply a drive current to the EPB motor 101a.

The EPB control unit 101b is configured to output a drive current to the EPB motor 101a for a predetermined period of time (e.g., for 1 second) when a parking brake activation switch 101c is turned from an OFF state to an ON state during the stationary state of the vehicle 100 so that the brake pads are pressed against the disc rotor of the wheel 102 and a braking force to be applied to the wheel 102 is generated. The EPB control unit 101b is also configured to output a drive current to the EPB motor 101a when the parking brake activation switch 101c is turned from the ON state to the OFF state or when an accelerator pedal is depressed so that the brake pads move away from the disc rotor of the wheel and the braking force on the wheel 102 is released. In other words, it is configured that an operating state of the EPB 101 is maintained from when the parking brake activation switch 101c is turned on to when the parking brake activation switch 101c is turned off or the accelerator pedal is depressed. The parking brake activation switch 101c may be a switch of either a lever-type or pedal-type.

An ABS device 104 is also mounted on the vehicle 100. The ABS device 104 is provided with an ABS sensor 104a and an ABS control unit 104b.

The ABS sensor 104a is a rotational speed sensor mounted on the wheel 102 to detect a rotation speed of the wheel 102 during motion of the vehicle. The ABS control unit 104b is mounted on the ECU 103 to control a brake unit based on an output of the ABS sensor 104a to adjust a braking force applied to the wheel 102 so that the wheel 102 is not locked when suddenly stopped. A twisted-pair wire 4 (a pair of second electric wires 3) as signal lines are connected to the ABS sensor 104a.

Figure 2A:
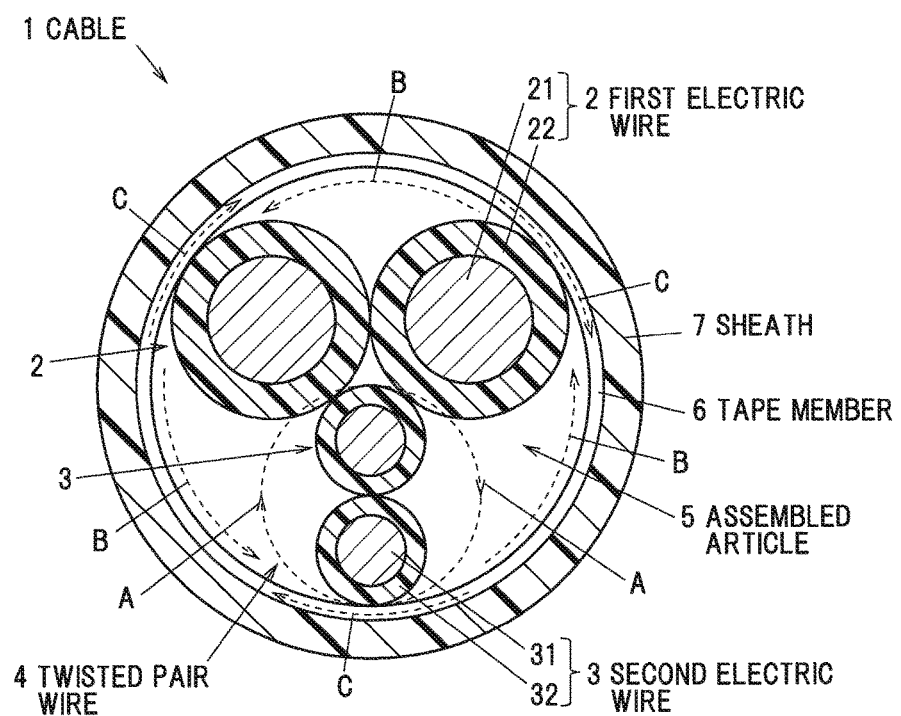
FIG. 2A is a cross sectional view showing the cable in the embodiment of the invention.
Figure 2B:
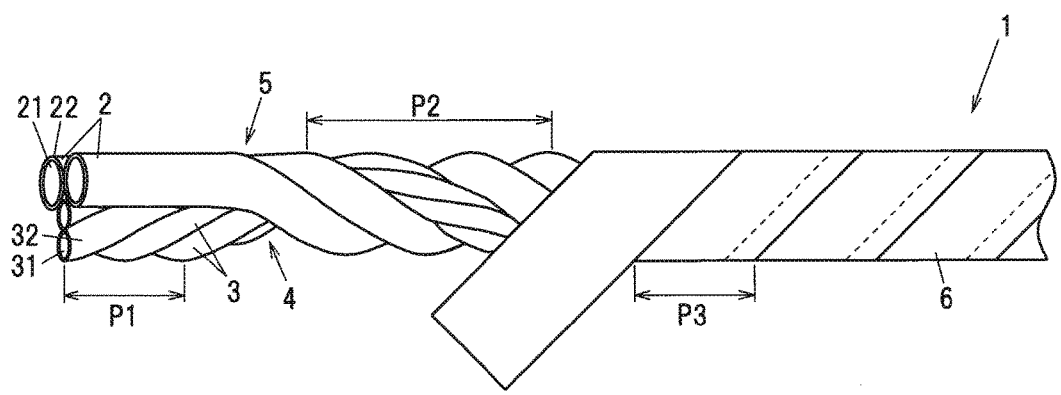
FIG. 2B is an explanatory diagram illustrating twist directions of a twisted-pair wire and an assembled article and a winding direction of a tape member in the cable.

A cable 1 in the present embodiment is obtained by covering the pair of first electric wires 2 and the twisted-pair wire 4 with one sheath 7 (see FIGS. 2A and 2B). The cable 1 extending out of the wheel 102 side is connected to a wire group 107 inside a junction box 106 provided on a vehicle body 105 and is then connected to the ECU 103 and a battery (not shown) via the wire group 107.

Although only one wheel 102 is shown in FIG. 1 to simplify the drawing, the EPB motor 101a and the ABS sensor 104a may be mounted on each of the wheels 102 of the vehicle 100, or may be mounted on, e.g., only front wheels or only rear wheels of the vehicle 100.

Description of the Cable 1

FIG. 2A is a cross sectional view showing the cable 1 in the present embodiment and FIG. 2B is an explanatory diagram illustrating twist directions of a twisted-pair wire and an assembled article and a winding direction of a tape member.

As shown in FIGS. 2A and 2B, the cable 1 is provided with plural electric wires 2 and 3, a tape member 6 spirally wound around an assembled article 5 which is formed by twisting the plural electric wires 2 and 3 together, and a sheath 7 covering the tape member 6.

In the present embodiment, the plural electric wires 2 and 3 include a pair of first electric wires 2 and a twisted-pair wire 4 which is formed by twisting a pair of second electric wires 3 having a smaller outer diameter than the first electric wires 2 and is arranged between the pair of first electric wires 2 in a circumferential direction. The assembled article 5 is formed by twisting the pair of first electric wires 2 and the twisted-pair wire 4.

The first electric wire 2 has a first conductor 21 and a first insulation 22 covering the first conductor 21. The first conductor 21 is constructed from a stranded conductor formed by twisting highly conductive strands of copper, etc., and the first insulation 22 is formed of an insulating resin such as cross-linked polyethylene. Strands having a diameter of not less than 0.05 mm and not more than 0.30 mm can be used to form the first conductor 21. When using strands having a diameter of less than 0.05 mm, sufficient mechanical strength may not be obtained, causing a decrease in flex resistance. When using strands having a diameter of more than 0.30 mm, flexibility of the cable 1 may decrease.

The second electric wire 3 has a second conductor 31 and a second insulation 32 covering the second conductor 31. The second conductor 31 is constructed from a stranded conductor formed by twisting highly conductive strands of copper, etc., and the second insulation 32 is formed of an insulating resin such as cross-linked polyethylene. Strands having a diameter of not less than 0.05 mm and not more than 0.30 mm can be used to form the second conductor 31, in the same manner as the first conductor 21.

The first electric wire 2 in the present embodiment is constructed using a power line for supplying a drive current to the EPB motor 101a mounted on the wheel 102 of the vehicle 100. Meanwhile, the second electric wire 3 in the present embodiment is constructed using a signal line for the ABS sensor 104a mounted on the wheel 102.

The cross sectional area (the conductor cross-sectional area) of the first conductor 21 and the thickness of the first insulation 22 in the first electric wire 2 are appropriately adjusted according to magnitude of required drive current. In the present embodiment, since the first electric wires 2 are used as power line and the second electric wires 3 are used as signal lines, the cross sectional area (the conductor cross-sectional area) of the first conductor 21 is larger than that of the second conductor 31. In the present embodiment, considering that the first electric wire 2 is a power line for supplying a drive current to the EPB motor 101a, the outer diameter of the first conductor 21 is set to not less than 1.5 mm and not more than 3.0 mm and the outer diameter of the first electric wire 2 is set to not less than 2.0 mm and not more than 4.0 mm.

The outer diameter of the second electric wire 3 is smaller than that of the first electric wire 2. In other words, the outer diameter of the first electric wire 2 is larger than that of the second electric wire 3. In the present embodiment, the twisted-pair wire 4 formed by twisting a pair (two) of second electric wires 3 are twisted with the pair of first electric wires 2 to form the assembled article 5. Therefore, from the viewpoint of making the outer diameter of the cable 1 close to a circular shape, it is desirable to use the second electric wire 3 which is about half the outer diameter of the first electric wire 2. In detail, it is possible to use the second electric wire 3 having an outer diameter of not less than 1.0 mm and not more than 1.8 mm. The second electric wire 3 used in this example has the second conductor 31 with a conductor cross-sectional area of not less than 0.13 mm$^2$ and not more than 0.30 mm$^2$.

A twist pitch P1 of the twisted-pair wire 4 is set by taking into account the outer diameter of the second electric wire 3 so that an unnecessary load is not applied to the second electric wires 3. The twist pitch P1 of the twisted-pair wire 4 here is about 30 mm, but the twist pitch P1 of the twisted-pair wire 4 is not limited thereto. The twist pitch P1 of the twisted-pair wire 4 is a distance along a longitudinal direction of the twisted-pair wire 4 between points at which a given second electric wire 3 is located at the same position in a circumferential direction of the twisted-pair wire 4.

The assembled article 5 is formed by twisting the pair of first electric wires 2 and the twisted-pair wire 4. In the present embodiment, the twisted-pair wire 4 is arranged between the pair of first electric wires 2 in the circumferential direction. In the cross section shown in FIG. 2A, one of the first electric wire 2, the other first electric wires 2 and the twisted-pair wire 4 are arranged clockwise in this order. The twisted-pair wire 4 is arranged so as to get into a triangle boundary area between the pair of first electric wires 2.

The assembled article 5 may be configured that plural thread-like (fibrous) fillers extending in the longitudinal direction of the cable 1 are arranged between the pair of first electric wires 2/the twisted-pair wire 4 and the tape member 6 and are twisted together with the pair of first electric wires 2 and the twisted-pair wire 4 even though it is not shown in FIGS. 2A and 2B. By arranging the fillers to fill a gap between the pair of first electric wires 2/the twisted-pair wire 4 and the tape member 6, a cross sectional shape after winding the tape member 6 around the assembled article 5 can be closer to a circle. Some of the plural fillers may be arranged in triangle boundary areas between the first electric wires 2 and the twisted-pair wire 4 and triangle boundary areas between the pair of first electric wires 2. As the filler, it is possible to use a fibrous material such as polypropylene yarn, spun rayon yarn (rayon staple fiber), aramid fiber, nylon fiber or fiber plastic, a paper or a cotton yarn.

In the EPB 101, a drive current is supplied to the motor 101a basically when the vehicle is stationary. On the other hand, the ABS sensor 104a is used when the vehicle is in motion and the ABS sensor 104a is not used during when the drive current is supplied through the first electric wires 2. Therefore, in the present embodiment, a shield conductor around each electric wire 2, 3 or the twisted pair wire 4 is omitted. Omitting the shield conductor allows the cable 1 to have a smaller outer diameter than when providing the shield conductor and also reduces the number of components, thereby reducing the cost.

Although the first electric wire 2 for supplying a drive current to the EPB motor 101a is described here, the first electric wire 2 may be used to supply a drive current to, e.g., an electric motor of an electro-mechanical brake (hereinafter, referred to as EMB) provided on the wheel 102. In this case, since an electric current flows through the first electric wires 2 also during motion of the vehicle 100, it is desirable to provide a shield conductor around the first electric wires 2 or around the twisted pair wire 4 (around the second electric wires 3) to prevent malfunction of the ABS device 104 due to noise.

Meanwhile, although the second electric wire 3 as a signal line for the ABS sensor 104a is described here, the second electric wire 3 may be a signal line used for another sensor provided on the wheel 102, e.g., for a temperature sensor or an air pressure sensor for detecting air pressure of a tire, etc., or may be a damper wire used to control a damping device of the vehicle 100, or moreover, may be a signal line for controlling the EMB (a CAN cable, etc.). Even when the first electric wire 2 is used to supply a drive current to the EPB motor 101a, it is desirable to provide a shield conductor around the first electric wires 2 or around the twisted pair wire 4 (around the second electric wires 3) in case of using the second electric wires 3 during the stationary state of the vehicle 100, to prevent malfunction due to noise.

The outer diameter of the entire assembled article 5 is, e.g., about 5 mm to 9 mm A twist pitch P2 of the assembled article 5 is set by taking into account the outer diameter of the assembled article 5 so that an unnecessary load is not applied to the first electric wires 2 and the twisted pair wire 4. The twist pitch P2 of the assembled article 5 here is about 60 mm, but the twist pitch P2 of the assembled article 5 is not limited thereto. The twist pitch P2 of the assembled article 5 is a distance along a longitudinal direction of the assembled article 5 two points at which a given first electric wire 2 or the twisted pair wire 4 is located at the same position in a circumferential direction of the assembled article 5.

The tape member 6 is spirally wound around the assembled article 5, and the tape member 6 is covered with the sheath 7. The sheath 7 is formed of, e.g., a urethane resin. In this example, a 0.8 mm-thick urethane resin is used as the sheath 7. Although a shield conductor around the tape member 6 is omitted in the present embodiment since the first electric wires 2 are used to supply a drive current to the EPB motor 101a and the drive current flows through the first electric wires 2 in a relatively short time, a shield conductor may be provided between the tape member 6 and the sheath 7 or around the sheath 7 depending on the intended use, etc., of the first electric wires 2.

Description of the Tape Member 6

The tape member 6 is spirally wound around the assembled article 5 so as to be in contact with all electric wires 2 and 3 covered with the tape member 6. The tape member 6 is interposed between the assembled article 5 and the sheath 7 and serves to reduce friction between the assembled article 5 (the electric wires 2 and 3) and the sheath 7 when being bent. In other words, providing the tape member 6 can reduce friction between the electric wires 2, 3 and the sheath 7 without a lubricant such as talc powder which is used in the conventional technique, and thus reduces stress applied to the electric wires 2 and 3 when being bent, and it is thereby possible to improve flex resistance.

The tape member 6 is spirally wound around the assembled article 5 while applying a tensile force. Thus, it is necessary to use the tape member 6 which is not broken by a tensile force applied during winding. Meanwhile, the tape member 6 is removed together with the sheath 7 when the cable is terminated. Therefore, it is desirable to use the tape member 6 which can be easily removed at the time of cable termination.

For this reason, the tape member 6 used in the present embodiment is configured that the tensile strength is different between the longitudinal direction and the width direction and is smaller in the width direction than in the longitudinal direction.

By having a large tensile strength in the longitudinal direction, the tape member 6 can be prevented from being broken when winding around the assembled article 5. In detail, the tensile strength of the tape member 6 in the longitudinal direction is desirably not less than 120 MPa.

In addition, by having a small tensile strength in the width direction, the tape member 6 can be easily torn at the time of cable termination and thus can be easily removed when removing the sheath 7, and stripping work efficiency is thereby improved.

For the tape member 6, the tensile strength in the width direction is desirably not more than ⅔ of the tensile strength in the longitudinal direction. In more detail, the tensile strength of the tape member 6 in the width direction is preferably not less than 15 MPa and not more than 80 MPa. When the tensile strength of the tape member 6 in the width direction is less than 15 MPa, the tape member 6 is easily torn and is difficult to handle, and also, the tape member 6 may be torn due to load applied when the cable is bent. On then other hand, when the tensile strength of the tape member 6 in the width direction is more than 80 MPa, it is difficult to remove the tape member 6 at the time of cable termination, causing a decrease in stripping work efficiency.

The thickness of the tape member 6 is preferably not less than 0.0028 mm and not more than 0.090 mm. This is because when the thickness of the tape member 6 is less than 0.0028 mm, the tape member 6 cannot have sufficient tensile strength in the longitudinal direction and is likely to be torn at the time of winding. On the other hand, when the thickness of the tape member 6 is more than 0.090 mm, it is hard to tear the tape member 6, making the stripping work difficult.

The width of the tape member 6 is preferably not less than 18 mm and not more than 35 mm. This is because when the width of the tape member 6 is less than 18 mm, the tape member 6 cannot have sufficient tensile strength in the longitudinal direction and is likely to be torn at the time of winding. On the other hand, when the width of the tape member 6 is more than 35 mm, the tape member 6 needs to be cut by a tool (blade), etc., in a large area at the time of stripping work and stripping work efficiency may decrease.

The width of the tape member 6 is determined so that creases are not formed on the tape member 6 when the tape member 6 is wound, and it is desirable that the width of the tape member 6 to be used be decreased with a decrease in the outer diameter of the entire assembled article 5. In the present embodiment, since the outer diameter of the assembled article 5 is 5 mm to 9 mm, the width of the tape member 6 not causing creases is up to about 50 mm. In other words, when the width of the tape member 6 is not less than 18 mm and not more than 35 mm, it is also possible to prevent creases from being formed on the tape member 6 at the time of winding.

The tape member 6 is spirally wound around the assembled article 5 so as to overlap at a portion in a width direction (a direction perpendicular to the longitudinal direction and thickness direction of the tape member 6). In the present embodiment, the tape member 6 is spirally wound with an overlap of not less than ¼ and not more than ½ of the width thereof. When the overlap width of the tape member 6 is more than ½, the tape member 6 is partially triple-overlapped, making the stripping work difficult. Therefore, the overlap width of the tape member 6 at least needs to be not more than ½. In the present embodiment, the overlapping portion of the tape member 6 is not adhered by an adhesive, etc.

Meanwhile, in the present embodiment, the tape member 6 is wound around the assembled article 5 with an inclination angle of not less than 30° and not more than 60° with respect to the longitudinal direction of the cable. Hereinafter, an inclination angle of tape member 6 with respect to the longitudinal direction of the cable (an angle formed between the longitudinal direction of the tape member 6 and the longitudinal direction of the cable at a given portion of the tape member 6 in the longitudinal direction when viewing this portion from the radial direction) is referred to as a winding angle of the tape member 6. When the winding angle of the tape member 6 is less than 30°, the cable 1 has less flexibility and is less likely to be bent since the tape member 6 becomes close to the longitudinally wrapped state, and also, it is hard to tear the tape member 6 since it is necessity to pull the tape member 6 in the longitudinal direction to tear the tape member 6 at the time of stripping work, and stripping work efficiency decreases. On the other hand, when the winding angle of the tape member 6 is more than 60°, it is difficult to remove the tape member 6 at the time of stripping work since the number of turns of the tape member 6 increases and the overlap width of the tape member 6 also increases, and also, creases are likely to be formed on the tape member 6. The winding angle of the tape member 6 can be adjusted by changing the width and the overlap width of the tape member 6.

A winding pitch P3 of the tape member 6, i.e., a distance along a longitudinal direction of the cable 1 between points at which the tape member 6 is located at the same circumferential position (e.g., a distance between the widthwise edges), depends on the width of the tape member 6 and the overlap width (a winding angle of the tape member 6) and is up to about 40 mm in this case. The winding pitch P3 of the tape member 6 here is about 30 mm, but the winding pitch P3 of the tape member 6 is not limited thereto. When the winding pitch P3 of the tape member 6 is increased, the tape member 6 becomes close to the longitudinally wrapped state and this may cause a decrease in flexibility or in strip work efficiency. Therefore, the winding pitch P3 of the tape member 6 is desirably not more than 40 mm.

It is desirable to use the tape member 6 which is slidable (has a low friction coefficient) with respect to the first insulation 22 of the first electric wire 2 and the second insulation 32 of the second electric wire 3 so that an unwanted stress applied to the electric wires 2 and 3 when the cable is bent is reduced. In more detail, a material of the tape member 6 is selected so that the friction coefficient (coefficient of static friction) between the tape member 6 and the insulations 22 and 32 is lower than the friction coefficient (coefficient of static friction) between the sheath 7 and the insulations 22 and 32 without interposition of the tape member 6.

The cable 1 in the present embodiment uses the tape member 6 which is configured that surface roughness is different between a surface on the assembled article 5 side and a surface on the sheath 7 side, and the surface on the sheath 7 side is rougher (has a larger surface roughness) than the surface on the assembled article 5 side.

Since the tape member 6 has a rough surface on the sheath 7 side, a resin constituting the sheath 7 gets into microscopic recesses on the surface of the tape member 6 on the sheath 7 side, and adhesion between the tape member 6 and the sheath 7 is improved by the anchor effect. As a result, when stripping the sheath 7, the sheath 7 and the tape member 6 do not separate from each other and can be easily removed together (in the integrated state), and stripping work efficiency is thus improved.

In addition, since the tape member 6 has a small surface roughness on the surface on the assembled article 5 side, the assembled article 5 can slide easily with respect to the tape member 6. Therefore, stress applied to the electric wires 2 and 3 when the cable is bent is reduced and flex durability is thus improved. Furthermore, since the assembled article 5 becomes slidable with respect to the tape member 6, it is easy to separate the sheath 7 and the tape member 6 from the assembled article 5 by pulling at the time of stripping work and stripping work efficiency is further improved.

The tape member 6 can be formed of, e.g., a non-woven fabric, paper such as Japanese paper, or resin (resin film, etc.).

When the tape member 6 is formed of a non-woven fabric, it is desirable to use a non-woven fabric which is formed of polyester, polypropylene, aramid fiber, nylon, acrylic fiber or glass fiber. In this case, the tape member 6 is less likely to absorb moisture and it is thus possible to prevent a phenomenon in which water evaporates from the tape member 6 due to heat during when applying the sheath 7 and causes foaming of the sheath 7. In addition, the tape member 6 when formed of a non-woven fabric desirably has an air permeability of not less than 30 cc/cm$^2$/sec and not more than 200 cc/cm$^2$/sec. This is because when the air permeability is less than 30 cc/cm$^2$/sec, the air containing water vapor is likely to be trapped in a space covered with the tape member 6, and the trapped air is blown out all at once through open spaces of the nonwoven fabric or the overlapping portions of the tape member 6 due to heat during when applying the sheath 7 and may cause foaming of the sheath 7. On the other hand, when the air permeability is larger than 200 cc/cm$^2$/sec, the sheath 7 may partially penetrate through the tape member 6, reach the electric wires 2 and 3 during when applying the sheath 7 and adhere to the electric wires 2 and 3, causing a decrease in workability at the time of termination.

It is also possible to use the tape member 6 formed by laminating two or more layers of different materials in a thickness direction, i.e., the tape member 6 having a laminated structure composed of not less than two layers. In this case, the tape member 6 is configured so that a surface to be in contact with the assembled article 5 is formed of any one of a non-woven fabric, a paper or a resin layer. For example, it can be configured such that the tape member 6 is formed by providing a resin layer formed of PET (polyethylene terephthalate), etc., on one side of a paper and is wound with the resin layer having a lower friction coefficient on the assembled article 5 side.

The tape member 6 may be further provided with an adhesive layer which is adhered to the surface on the sheath 7 side by lamination, etc., and is thermally bonded to the sheath 7 by heat during when applying the sheath 7. This makes the tape member 6 and the sheath 7 further less likely to separate from each other, and the stripping work efficiency is further improved. The adhesive layer is integrally provided on the tape member 6, but is regarded as a separate member from the tape member 6 in the present embodiment. That is, when the adhesive layer is provided, the surface of the tape member 6 on the sheath 7 side means the surface adhered to the adhesive layer. In addition, when the adhesive layer is provided, the tape member 6 may be configured such that surface roughness of the surface on the sheath 7 side is the same as that of the surface on the assembled article 5 side.

Twist Directions of the Twisted-Pair Wire 4 and the Assembled Article 5 and Winding Direction of the Tape Member 6

The cable 1 of the present embodiment is configured that the twist direction of the twisted-pair wire 4 is different from the twist direction of the assembled article 5, and the twist direction of the assembled article 5 is different from the winding direction of the tape member 6. In other words, in the cable 1, the twist direction of the twisted-pair wire 4 and the winding direction of the tape member 6 are the same and only the twist direction of the assembled article 5 is different.

The twist direction of the twisted-pair wire 4 here is a direction that the second electric wires 3 rotate from the base end toward the front end in the circumferential direction of the twisted-pair wire 4 when the cable 1 is viewed from the front end side (the left side of FIG. 2B, on the side where the tape member 6 overlaps upon itself). Meanwhile, the twist direction of the assembled article 5 is a direction that the twisted-pair wire 4 and the first electric wires 2 rotate from the base end toward the front end in the circumferential direction of the assembled article 5 when the cable 1 is viewed from the front end side (the left side of FIG. 2B, on the side where the tape member 6 overlaps upon itself). In this example, the twist direction of the twisted-pair wire 4 is the right rotation (clockwise) and the twist direction of the assembled article 5 is the left rotation (counterclockwise).

Meanwhile, the winding direction of the tape member 6 is a direction that the tape member 6 rotates from the base end toward the front end when the cable 1 is viewed from the front end side (the left side of FIG. 2B, on the side where the tape member 6 overlaps upon itself). In this example, the winding direction of the tape member 6 is the right rotation (clockwise). The cross section as viewed from the front end side is shown in FIG. 2A in which the twist direction of the twisted-pair wire 4 is indicated by a dashed arrow A, the twist direction of the assembled article 5 is indicated by a dashed arrow B and the winding direction of the tape member 6 is indicated by a dashed arrow C.

In general, when twisting electric wires together or spirally winding a tape, a kink is formed according to the twist direction or the winding direction and the entire cable curves spontaneously. In the present embodiment, the twist direction of the twisted pair wire 4 is different from the twist direction of the assembled article 5 and also the twist direction of the assembled article 5 is different from the winding direction of the tape member 6. Therefore, the kink of the twisted pair wire 4 and the kink of the assembled article 5 are in the opposite directions and thus cancel out each other, and also, the kink of the assembled article 5 and the kink caused by winding the tape member 6 are in the opposite directions and thus cancel out each other, and it is thereby possible to easily realize a straight cable 1 which is prevented from kinking up. As a result, it is possible to reduce variation in bending properties in the longitudinal direction of the cable 1.

In case that the twist direction of the twisted pair wire 4 is the same as the twist direction of the assembled article 5, the twisted pair wire 4 may be distorted in a direction of tightening the twist when twisting the assembled article 5, causing a change in the twist pitch P1 of the twisted pair wire 4. Differing the twist direction of the twisted pair wire 4 from the twist direction of the assembled article 5 allows the assembled article 5 to be formed while suppressing a change in the twist pitch P1 of the twisted pair wire 4.

In this regard, however, if the twist pitch P1 of the twisted pair wire 4 is large, the twist of the twisted pair wire 4 may loosen when twisting the assembled article 5. Therefore, the twist pitch P1 of the twisted pair wire 4 is desirably smaller than at least the twist pitch P2 of the assembled article 5. In other words, when the twist direction of the twisted pair wire 4 is different from the twist direction of the assembled article 5, adjusting the twist pitch P1 of the twisted pair wire 4 to smaller than the twist pitch P2 of the assembled article 5 allows the twist of the twisted pair wire 4 to be less likely to unravel and it is thereby possible to stabilize the cross sectional shape of the assembled article 5.

In the present embodiment, since the kink caused by winding the tape member 6 is used to straighten the kink of the assembled article 5, the winding pitch P3 of the tape member 6 needs to be small enough to cause a kink. Therefore, the winding pitch P3 of the tape member 6 is desirably smaller than at least the twist pitch P2 of the assembled article 5. In the present embodiment, the twist pitch P1 of the twisted pair wire 4 is about 30 mm, the twist pitch P2 of the assembled article 5 is about 60 mm and the winding pitch P3 of the tape member 6 is about 30 mm.

In addition, the winding pitch P3 of the tape member 6 only needs to be not less than the twist pitch P1 of the twisted pair wire 4. In such a configuration, it is possible to reduce distortion of the tape member 6 at a portion in contact with the twisted pair wire 4 and it is easy to form the cable 1 having a circular cross sectional shape.

If the winding pitch P3 of the tape member 6 is smaller than the twist pitch P1 of the twisted-pair wire 4, the tape member 6 with the small winding pitch P3 stretches and contracts in the longitudinal direction when bending the cable 1 and is less likely to receive a load caused by the bending, and the load caused by the bending is concentrated on the twisted-pair wire 4 which has the large twist pitch P1 and is less likely to stretch and contract. When the winding pitch P3 of the tape member 6 is not less than the twist pitch P1 of the twisted-pair wire 4, it is possible to partially distribute the load caused by the bending to the tape member 6 so that the load caused by the bending is prevented from being concentrated on the twisted-pair wire 4, thereby improving flex resistance.

In addition, since the twist direction of the assembled article 5 is different from the winding direction of the tape member 6, the twist pitch P2 of the assembled article 5 is less likely to change when winding the tape member 6 and it is thereby possible to stabilize the twist pitch P2 of the assembled article 5.

Furthermore, by differentiating the twist direction of the assembled article 5 from the winding direction of the tape member 6, the tape member 6 is prevented from entering a gap between the twisted-pair wire 4 and the first electric wire 2 or between the first electric wires 2 and it is thereby possible to form the cable 1 having a cross sectional shape closer to a circle. This results in improving the outer appearance of the cable 1 and also allows the sheath 7 to be easily stripped and removed. Since the kink is reduced in the cable 1 as described above, the sheath 7 is stripped and removed more easily.

Furthermore, by differentiating the twist direction of the assembled article 5 from the winding direction of the tape member 6, a direction likely to cause buckling of the assembled article 5 can be different from a direction likely to cause buckling of the tape member 6. Therefore, it is possible to realize the cable 1 which is less likely to buckle even when, e.g., twist and bend are simultaneously applied to the cable 1.

Description of Wire Harness Using the Cable 1

Figure 3:
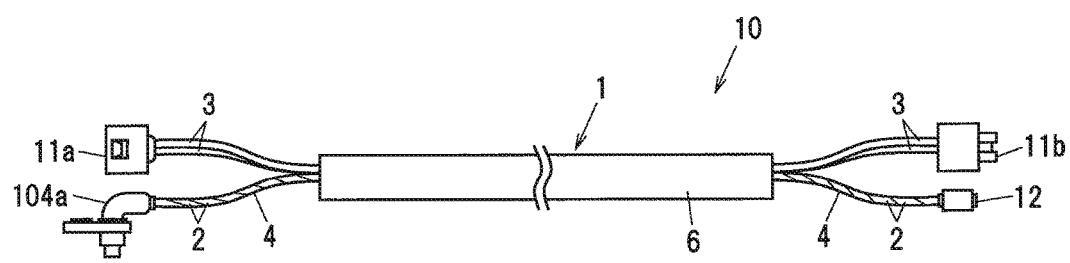
FIG. 3 is a schematic configuration diagram illustrating a wire harness in the embodiment of the invention.

FIG. 3 is a schematic configuration diagram illustrating a wire harness in the present embodiment.

As shown in FIG. 3, a wire harness 10 is composed of the cable 1 in the present embodiment and a connector attached to at least one of end portions of the electric wires 2 and 3.

In FIG. 3, an end portion on the wheel 102 side is shown on the left side and an end portion on the vehicle body 105 side (the junction box 106 side) is shown on the right side. In the following description, an end of the wire harness 10 on the wheel 102 side is referred to as "one end" and another end on the vehicle body 105 side (the junction box 106 side) is referred to as "other end".

A wheel-side power connector 11a for connection to the EPB motor 101a is attached to one end of the pair of first electric wires 2, and a vehicle body-side power connector 11b for connection to the wire group 107 inside the junction box 106 is attached to the other end of the pair of first electric wires 2.

The ABS sensor 104a is attached to one end of the pair of second electric wires 3 (the twisted-pair wire 4), and a vehicle body-side ABS connector 12 for connection to the wire group 107 inside the junction box 106 is attached to the other end of the pair of second electric wires 3 (the twisted pair wire 4).

Although the separate connectors are provided on the first electric wires 2 and the second electric wires 3 (the twisted-pair wire 4) in this example, one dedicated connector may be provided so that both electric wires 2 and 3 are connected all together.

Functions and Effects of the Embodiment

As described above, the cable 1 in the present embodiment is provided with the tape member 6 spirally wound around the assembled article 5, the thickness of the tape member 6 is not less than 0.028 mm and not more than 0.090 mm, a width of the tape member 6 is not less than 18 mm and not more than 35 mm, the tape member 6 is spirally wound with an overlap of not less than ¼ and not more than ½ of the width thereof, and a tensile strength of the tape member 6 is different between the longitudinal direction and the width direction and is smaller in the width direction than in the longitudinal direction.

Providing the tape member 6 can reduce friction between the electric wires 2, 3 and the sheath 7 without using a lubricant such as talc powder, and thus reduces stress applied to the electric wires 2 and 3 when being bent, and it is thereby possible to improve flex resistance. That is, in the present embodiment, it is possible to prevent deterioration of working environment during cable termination while maintaining flex resistance of the cable.

The tape member 6 has a thickness of not less than 0.028 mm and not more than 0.090 mm, a width of not less than 18 mm and not more than 35 mm, the overlap width of not less than ¼ and not more than ½ of the tape width, and the tensile strength which is smaller in the width direction than in the longitudinal direction. Due to this configuration, while the tape member 6 is prevented from being broken at the time of winding, the tape member 6 can be easily torn at the time of cable termination and this improves stripping work to remove the sheath 7 and the tape member 6.

Furthermore, in the cable 1 of the present embodiment, the tape member 6 is configured that surface roughness is different between the surface on the assembled article 5 side and the surface on the sheath 7 side, and the surface on the sheath 7 side has a larger surface roughness than the surface on the assembled article 5 side. By configuring the tape member 6 to have a larger surface roughness on the surface on the sheath 7 side than the surface on the assembled article 5 side, it is possible to increase adhesion between the tape member 6 and the sheath 7 and thus to improve stripping work efficiency, and it is also possible to make the assembled article 5 (the electric wires 2 and 3) slidable with respect to the tape member 6 and thus to improve flex durability.

In addition, in the cable 1, by differentiating the twist direction of the twisted-pair wire 4 from the twist direction of the assembled article 5 and also differing the twist direction of the assembled article 5 from the winding direction of the tape member 6, the kink due to the twisting or the winding of the tape member 6 can be reduced and it is also possible to stabilize the twist pitches P1 and P2 of the twisted pair-wire 4 and the assembled article 5. As a result, it is possible to reduce variation in bending properties, and also, flexibility in the longitudinal direction is stabilized and it is thereby possible to realize the cable 1 which is easy to route. Furthermore, since it is possible to form the cable 1 having a cross sectional shape closer to a circle, the sheath 7 can be stripped more easily.

OTHER EMBODIMENTS

Figure 4A:
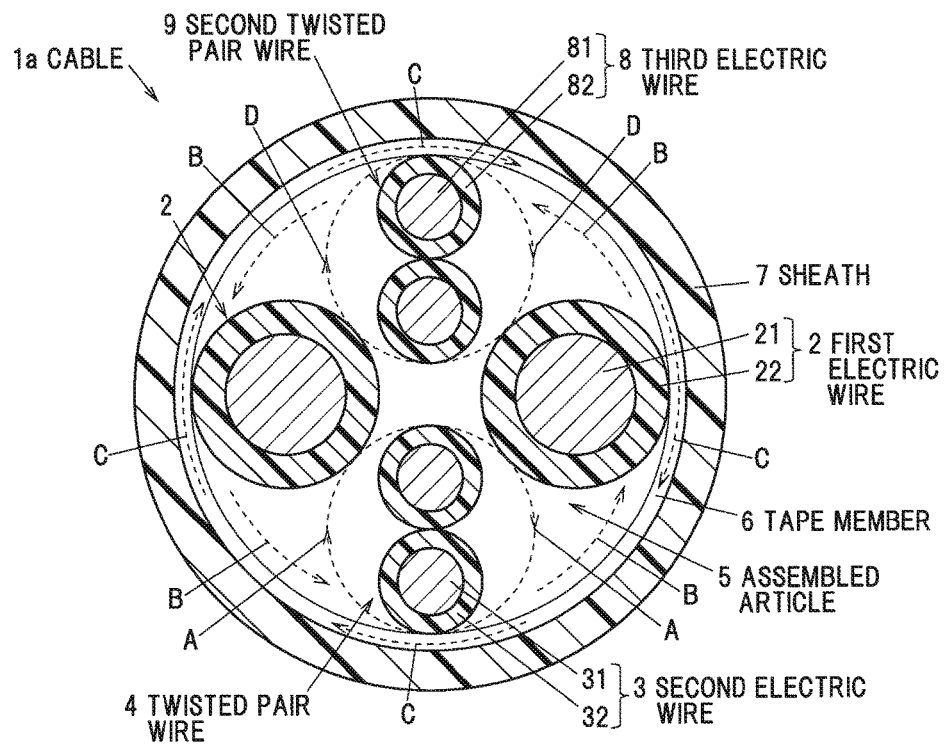
FIG. 4A is a cross sectional view showing the cable in the embodiment of the invention.
Figure 4B:
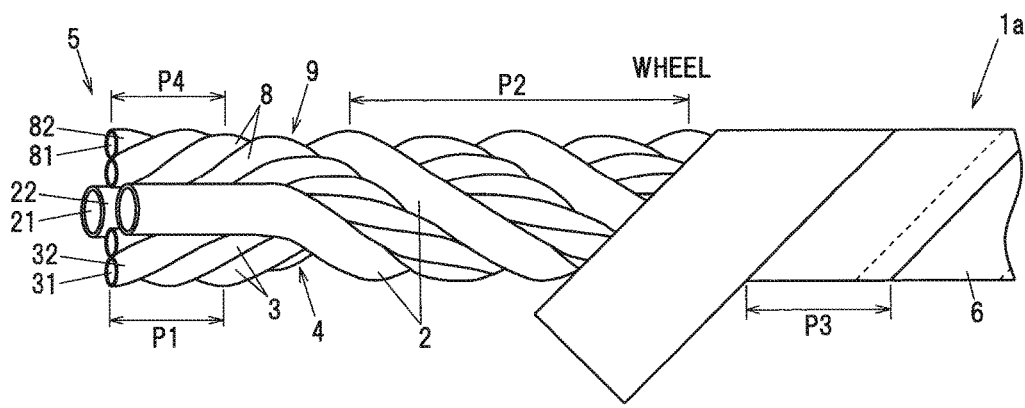
FIG. 4B is an explanatory diagram illustrating the twist directions of the twisted-pair wire and the assembled article and the winding direction of the tape member in the cable.

A cable 1a shown in FIGS. 4A and 4B is based on the cable 1 shown in FIG. 2 but is further provided with a second twisted-pair wire 9 which is formed by twisting a pair of third electric wires 8.

The third electric wire 8 may be a signal line used for a temperature or an air pressure sensor for detecting air pressure of a tire, etc., or may be a damper wire used to control a damping device of the vehicle 100, or moreover, may be a signal line for controlling the EMB (a CAN cable, etc.).

The third electric wire 8 has a third conductor 81 and a third insulation 82 covering the third conductor 81. The third conductor 81 is constructed from a stranded conductor formed by twisting highly conductive strands of copper, etc., and the third insulation 82 is formed of an insulating resin such as cross-linked polyethylene. Strands having a diameter of not less than 0.05 mm and not more than 0.30 mm can be used to form the third conductor 81, in the same manner as the first conductor 21.

The third electric wire 8 has a smaller outer diameter than the first electric wire 2. From the viewpoint of making the outer diameter of the cable 1a close to a circular shape, it is desirable to use the third electric wire 8 which is about half the outer diameter of the first electric wire 2 in the same manner as the second electric wire 3, and it is possible to use the third electric wire 8 having an outer diameter of, e.g., not less than 1.0 mm and not more than 1.8 mm.

The third electric wire 8 used in this example has the third conductor 81 with a conductor cross-sectional area of not less than 0.30 mm$^2$ and not more than 0.50 mm$^2$. Since the conductor cross-sectional area of the second conductor 31 is not less than 0.13 mm$^2$ and not more than 0.30 mm$^2$ as previously described, the third electric wire 8 has a larger cross-sectional area than the second electric wire 3 in the cable 1a. However, the second electric wire 3 and the third electric wire 8 may have the same conductor cross-sectional area. From the viewpoint of making the cross sectional shape of the cable 1a closer to a circular shape, it is desirable that the outer diameters of the second electric wire 3 and the third electric wire 8 be substantially the same (e.g., a difference in outer diameter between the second electric wire 3 and the third electric wire 8 is within 20% of the outer diameter of the second electric wire 3).

The twist direction of the second twisted-pair wire 9 is the same as the twist direction of the twisted-pair wire 4. The twist direction of the second twisted-pair wire 9 here is a direction that the third electric wire 8 rotates from the base end toward the front end in the circumferential direction of the second twisted-pair wire 9 when the cable 1a is viewed from the front end side (the left side of FIG. 4B, on the side where the tape member 6 overlaps upon itself). As indicated by the a dashed arrow D in FIG. 4A, the twist direction of the second twisted-pair wire 9 in the cable 1a is different from the twist direction of the assembled article 5 and is the same as the winding direction of the tape member 6.

Meanwhile, a twist pitch P4 of the second twisted-pair wire 9 is substantially the same as the twist pitch P1 of the twisted-pair wire 4. Alternatively, the twist pitches P1 and P4 of the twisted-pair wires 4 and 9 may be different from each other. The twist pitch P4 of the second twisted-pair wire 9 is a distance along a longitudinal direction of the second twisted-pair wire 9 between points at which a given third electric wire 8 is located at the same position in a circumferential direction of the second twisted-pair wire 9.

The second twisted-pair wire 9 is arranged in one of spaces between the pair of first electric wires 2 in the circumferential direction in which the twisted-pair wire 4 is not arranged. The second twisted-pair wire 9 is arranged so as to get into a triangle boundary area between the pair of first electric wires 2. In the cross section shown in FIG. 4A, one of the first electric wires 2, the second twisted-pair wire 9, the other first electric wire 2 and the twisted-pair wire 4 are arranged clockwise in this order.

In the cable 1a which is provided with two twisted-pair wires 4 and 9, when, for example, the first electric wires 2 are arranged adjacent to each other in the circumferential direction (when the two twisted-pair wires 4 and 9 are arranged adjacent to each other), the center of gravity of the assembled article 5 largely shifts from the center position of the assembled article 5, and the assembled article 5 formed by twisting the two twisted-pair wires 4 and 5 and the first electric wires 2 in such a state is entirely distorted. In this case, it is difficult to manufacture a straight cable 1 and there is also a problem that the cable is not flexible in some directions at some portions in a longitudinal direction, resulting in a decrease in flexibility. By arranging the twisted-pair wire 4 and the second twisted-pair wire 9 each in a space between the first electric wires 2 in the circumferential direction as in the present embodiment, it is possible to easily realize the straight cable 1 and also to suppress a decrease in flexibility since a defect such as non-flexibility in some directions at some portions in the longitudinal direction is prevented from occurring.

In addition, in the cable 1a, the twisted-pair wire 4 and the second twisted-pair wire 9 are separated by the pair of first electric wires 2 which supply a drive current to the EPB 101 mainly after the vehicle is stopped. This can reduce crosstalk between the twisted-pair wire 4 and the second twisted-pair wire 9 even when shield conductors around the twisted-pair wires 4 and 9 are omitted.

Also in case of the cable 1a which is further provided with the second twisted-pair wire 9, the tape member 6 is configured that tensile strength in the width direction is smaller than in the longitudinal direction. Therefore, while the tape member 6 is prevented from being broken at the time of winding, the tape member 6 can be easily torn at the time of cable termination and this improves stripping work to remove the sheath 7 and the tape member 6.

In addition, also in case of the cable 1a which is further provided with the second twisted-pair wire 9, by configuring the tape member 6 to have a larger surface roughness on the surface on the sheath 7 side than the surface on the assembled article 5 side, it is possible to increase adhesion between the tape member 6 and the sheath 7 and thus to improve stripping work efficiency, and it is also possible to make the assembled article 5 (the electric wires 2, 3 and 8) slidable with respect to the tape member 6 and thus to improve flex durability of the cable 1a.

Figure 5A:
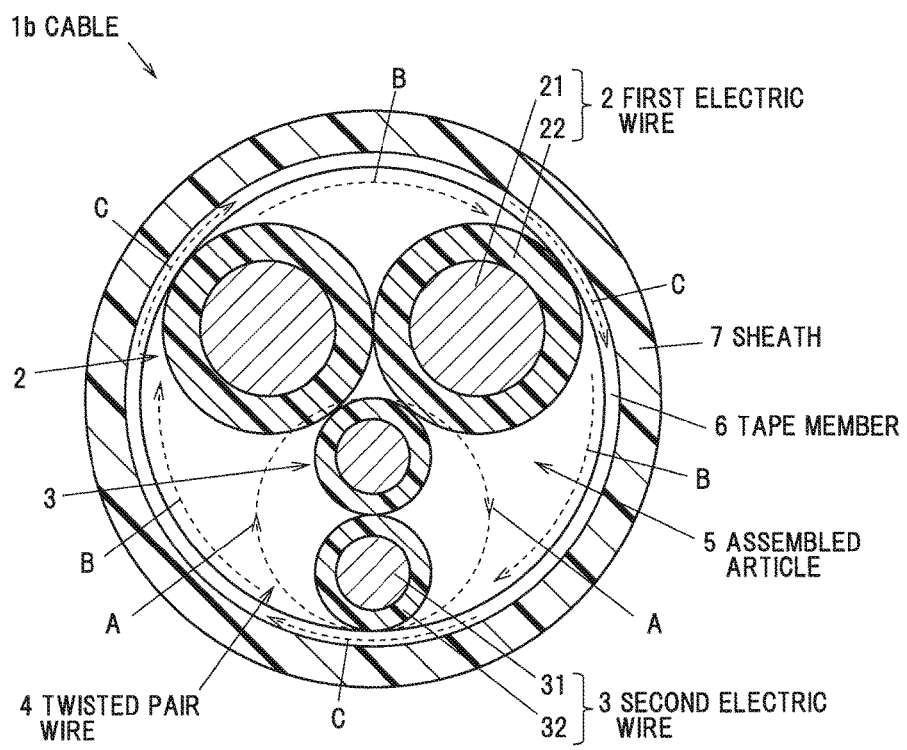
FIG. 5A is a cross sectional view showing the cable in the embodiment of the invention.
Figure 5B:
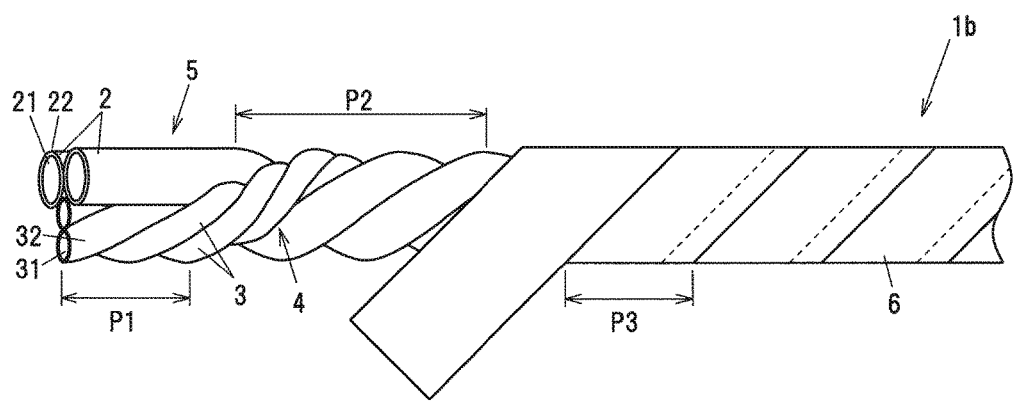
FIG. 5B is an explanatory diagram illustrating the twist directions of the twisted-pair wire and the assembled article and the winding direction of the tape member in the cable.

A cable 1b shown in FIGS. 5A and 5B is the same as the cable 1 shown in FIGS. 2A and 2B, except that the twist direction of the assembled article 5 (indicated by a dashed arrow B) is opposite.

In other words, the cable 1b is configured that the twist direction of the twisted-pair wire 4, the twist direction of the assembled article 5 and the winding direction of the tape member 6 are the same.

Since the twist direction of the twisted-pair wire 4, the twist direction of the assembled article 5 and the winding direction of the tape member 6 are the same, the twist of the assembled article 5 spontaneously unravels by unwinding the tape member 6 when terminating the cable and the twist of the twisted-pair wire 4 then spontaneously unravels by the unraveling of the twist of the assembled article 5, and it is easy to unravel the electric wires 2 and 3. This improves disassemblability of the cable 1b and thereby improves cable termination workability.

In addition, since the twist direction of the twisted-pair wire 4, the twist direction of the assembled article 5 and the winding direction of the tape member 6 are the same, the twisted-pair wire 4, the assembled article 5 and the tape member 6 are loosened or tightened synchronously when the cable 1b is distorted, and it is thereby possible to improve distortion resistance.

If, on the other hand, for example, the twist direction of the assembled article 5 is opposite to the winding direction of the tape member 6, and when the cable 1b is distorted in a direction in which the assembled article 5 is loosened (in which the diameter of the assembled article 5 is increased), the tape member 6 is tightened (the diameter of the tape member 6 is reduced) since the twist direction of the assembled article 5 is opposite to the winding direction of the tape member 6. At this time, the assembled article 5 being loosened is squeezed by the tape member 6. Thus, stress is applied to the assembled article 5, resulting in that an excessive load is applied to a portion of the twisted-pair wire 4. In the present embodiment, the twist direction of the twisted-pair wire 4, the twist direction of the assembled article 5 and the winding direction of the tape member 6 are configured to be the same so that the twisted-pair wire 4, the assembled article 5 and the tape member 6 are loosened or tightened synchronously. This allows the composite cable 1b to have improved distortion resistance.

Furthermore, since the twist direction of the twisted-pair wire 4 are the same as the twist direction of the assembled article 5, the assembled article 5 is twisted such that the twisted-pair wire 4 and the first electric wires 2 are twisted together in a direction along the kink on the twisted-pair wire 4 caused by twisting the two second electric wires 3. Therefore, when the cable 1b is bent, the twisted-pair wire 4 and the assembled article 5 elongate or contract synchronously in the longitudinal direction of the composite cable 1b. This allows the cable 1b to be bent easily and it is thereby possible to improve flexibility of the cable 1b.

In the cable 1b, the assembled article 5 is formed by twisting in a direction along the kink on the twisted-pair wire 4. Therefore, when the sheath 7 is not manually unwound but the sheath 7 and the tape member 6 are removed together by a dedicated stripping tool, etc., the twisted-pair wire 4 and the first electric wires 2 tend to remain in the twisted state because of the influence of the kink on the twisted-pair wire 4. Stripping work is carried out in several stages when the removal length of the sheath 7 for cable termination is long. In case of the cable 1b, since the twisted state of the twisted-pair wire 4 and the first electric wires 2 is maintained after each stripping work, the stripping work can be easily carried out in several stages.

In the cable 1b in which the twist direction of the twisted-pair wire 4 is the same as the twist direction of the assembled article 5, if the twist pitch P1 of the twisted-pair wire 4 is the same as the twist pitch P2 of the assembled article 5, the position of the first electric wires 2 relative to the second electric wires 3 is always the same throughout the longitudinal direction and this may cause the deformed appearance of the cable 1b. Therefore, the twist pitch P1 of the twisted-pair wire 4 is desirably different from the twist pitch P2 of the assembled article 5 (more specifically, the twist pitch P1 of the twisted-pair wire 4 is smaller than the twist pitch P2 of the assembled article 5 by not less than 10% and not more than 80% of the twist pitch P2 of the assembled article 5). When the twist pitches pitch P1 of the twisted-pair wire 4 is larger than the twist pitch P2 of the assembled article 5, the twist pitch P1 of the twisted-pair wire 4 may change at the time of twisting the assembled article 5. Therefore, the twist pitch P1 of the twisted-pair wire 4 is desirably smaller than at least the twist pitch 2 of the assembled article 5.

When the twist pitch P2 of the assembled article 5 is reduced, the cable 1b becomes more flexible and is easily bent but distortion resistance decreases due to the reduced looseness of the twist. On the other hand, when the twist pitch P2 of the assembled article 5 is increased, distortion resistance is improved but flexibility decreases. In the cable 1b, since a load is dispersed by synchronously loosening or tightening the twisted-pair wire 4, the assembled article 5 and the tape member 6 when being distorted, it is possible to provide enough distortion resistance even when the twist pitch P2 of the assembled article 5 is reduced to improve flexibility.

When the twist pitch P2 of the assembled article 5 is the same as the winding pitch P3 of the tape member 6, the tape member 6 is likely to enter a gap between the twisted-pair wire 4 and the first electric wires 2 or between the pair of first electric wires 2 due to pressure generated when covering the outer periphery of the tape member 6 with the sheath 7, which may cause the assembled article 5 with the tape member 6 wound therearound to have a deformed cross sectional shape and thus a poor outer appearance, or may cause the assembled article 5 to be less likely to slide inside the tape member 6 and thus a decrease in flexibility. Therefore, the winding pitch P3 of the tape member 6 is desirably different from the twist pitch P2 of the assembled article 5

(more specifically, the winding pitch P3 of the tape member 6 is smaller than the twist pitch P2 of the assembled article 5 by not less than 10% and not more than 80% of the twist pitch P2 of the assembled article 5).

The winding pitch P3 of the tape member 6 only needs to be not less than the twist pitch P1 of the twisted-pair wire 4. In such a configuration, it is possible to reduce distortion of the tape member 6 at a portion in contact with the twisted-pair wire 4 and it is easy to form the cable 1b having a circular cross sectional shape.

Figure 6A:
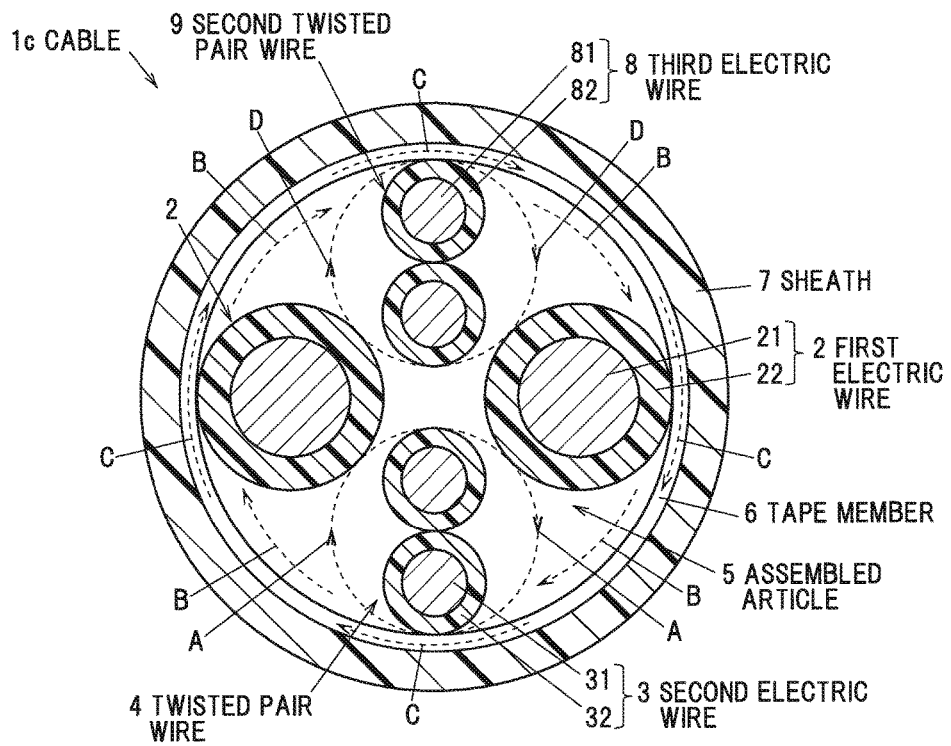
FIG. 6A is a cross sectional view showing the cable in the embodiment of the invention.
Figure 6B:
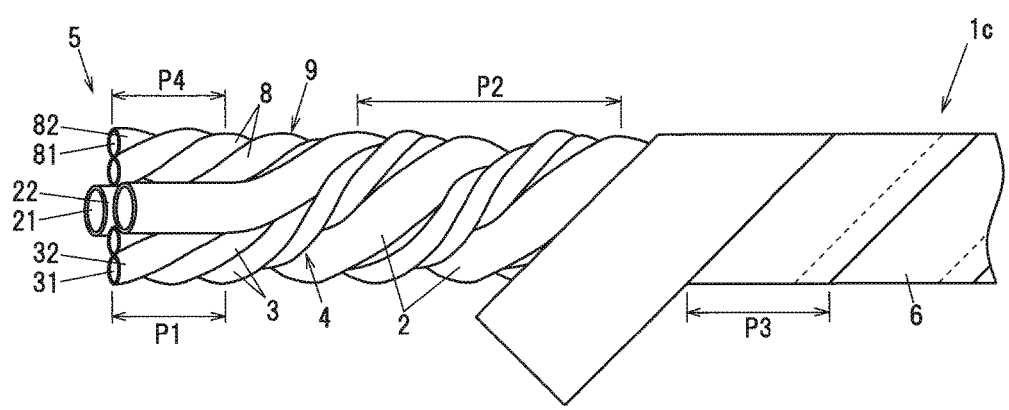
FIG. 6B is an explanatory diagram illustrating the twist directions of the twisted-pair wire and the assembled article and the winding direction of the tape member in the cable.

A cable 1c shown in FIGS. 6A and 6B is based on the cable 1b shown in FIGS. 5A and 5B but is further provided with the second twisted-pair wire 9 which is formed by twisting a pair of third electric wires 8. In other words, the cable 1c is the same as the cable 1a except that the twist direction of the assembled article 5 (indicated by a dashed arrow B) is opposite.

Also in case of the cable 1c which is provided with the second twisted-pair wire 9, the twist directions of the twisted-pair wires 4 and 9, the twist direction of the assembled article 5 and the winding direction of the tape member 6 are the same. This makes easy to unravel the electric wires 2, 3 and 8, thereby improving disassemblability, cable termination workability and distortion resistance.

Summary of the Embodiments

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A cable (1), comprising: a plurality of electric wires (2, 3); and a tape member (6) spirally wound around an assembled article (5) that is formed by twisting the plurality of electric wires (2, 3), wherein the thickness of the tape member (6) is not less than 0.028 mm and not more than 0.090 mm, a width of the tape member (6) is not less than 18 mm and not more than 35 mm, the tape member (6) is spirally wound with an overlap of not less than ¼ and not more than ½ of the width thereof, and a tensile strength of the tape member (6) is different between the longitudinal direction and the width direction and is smaller in the width direction than in the longitudinal direction.

[2] The cable (1) defined by [1], wherein the tape member (6) is wound around the assembled article (5) with an inclination angle of not less than 30° and not more than 60° with respect to the longitudinal direction of the cable.

[3] The cable (1) defined by [1] or [2], wherein the plurality of electric wires (2, 3) comprise a pair of first electric wires (2) and one or two twisted-pair wires (4) each formed by twisting a pair of second electric wires (3) having a smaller outer diameter than the first electric wires (2) and arranged between the pair of first electric wires (2) in a circumferential direction, a twist direction of the twisted pair wire (4) is different from a twist direction of the assembled article (5) and the twist direction of the assembled article (5) is different from a winding direction of the tape member (6).

[4] The cable (1b) defined by [1] or [2], wherein the plurality of electric wires (2, 3) comprise a pair of first electric wires (2) and one or two twisted-pair wires (4) each formed by twisting a pair of second electric wires (3) having a smaller outer diameter than the first electric wires (2) and arranged between the pair of first electric wires (2) in a circumferential direction, and the twist direction of the twisted-pair wire (4) and the twist direction of the assembled article (5) and the winding direction of the tape member (6) are the same.

[5] The cable (1) defined by any one of [1] to [4], wherein the tape member (6) is configured so that the tensile strength in the width direction is not more than ⅔ of the tensile strength in the longitudinal direction.

[6] A wire harness (10), comprising: the cable (1) defined by any one of [1] to [5]; and a connector attached to at least one of end portions of the electric wires (2, 3).

[7] A cable (1), comprising: a plurality of electric wires (2, 3); a tape member (6) spirally wound around an assembled article (5) that is formed by twisting the plurality of electric wires (2, 3); and a sheath (7) covering the tape member (6), wherein surface roughness of the tape member (6) is different between a surface on the assembled article (5) side and a surface on the sheath (7) side, and the surface on the sheath (7) side has a larger surface roughness than the surface on the assembled article (5) side.

[8] The cable (1) defined by [7], wherein the thickness of the tape member (6) is not less than 0.028 mm and not more than 0.090 mm, a width of the tape member (6) is not less than 18 mm and not more than 35 mm, the tape member (6) is spirally wound with an overlap of not less than ¼ and not more than ½ of the width thereof, and a tensile strength of the tape member (6) is different between the longitudinal direction and the width direction and is smaller in the width direction than in the longitudinal direction.

[9] The cable (1) defined by [7] or [8], wherein the plurality of electric wires (2, 3) comprise a pair of first electric wires (2) and one or two twisted-pair wires (4) each formed by twisting a pair of second electric wires (3) having a smaller outer diameter than the first electric wires (2) and arranged between the pair of first electric wires (2) in a circumferential direction, a twist direction of the twisted pair wire (4) is different from a twist direction of the assembled article (5), and the twist direction of the assembled article (5) is different from a winding direction of the tape member (6).

[10] The cable (1b) defined by [7] or [8], wherein the plurality of electric wires (2, 3) comprise a pair of first electric wires (2) and one or two twisted-pair wires (4) each formed by twisting a pair of second electric wires (3) having a smaller outer diameter than the first electric wires (2) and arranged between the pair of first electric wires (2) in a circumferential direction, and the twist direction of the twisted-pair wire (4) and the twist direction of the assembled article (5) and the winding direction of the tape member (6) are the same.

[11] The cable (1) defined by any one of [7] to [10], further comprising: an adhesive layer adhered to the surface of the tape member (6) on the sheath (7) side and thermally bonded to the sheath (7).

[12] The cable (1) defined by any one of [7] to [11], wherein the tape member (6) is formed by laminating two or more layers of different materials in a thickness direction.

[13] A wire harness (10), comprising: the cable (1) defined by any one of [7] to [12]; and a connector attached to at least one of end portions of the electric wires (2, 3).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof.

What is claimed is:

1. A cable, comprising:
   a plurality of electric wires;
   a tape member wound around an assembled article that is formed by twisting the plurality of electric wires; and
   a sheath covering the tape member,
   wherein a surface roughness of the tape member is different between a surface on an assembled article side and a surface on a sheath side and, the surface on the sheath side has a larger surface roughness than the surface on the assembled article side.

2. The cable according to claim 1, wherein the tape member is spirally wound around the assembled article,
   wherein the plurality of electric wires comprise a pair of first electric wires and one or two twisted-pair wires each formed by twisting a pair of second electric wires having a smaller outer diameter than the first electric wires and arranged between the pair of first electric wires in a circumferential direction,
   wherein a twist direction of the twisted pair wire is different from a twist direction of the assembled article, and the twist direction of the assembled article is different from a winding direction of the tape member.

3. The cable according to claim 1, wherein the tape member is spirally wound around the assembled article,
   wherein the plurality of electric wires comprise a pair of first electric wires and one or two twisted-pair wires each formed by twisting a pair of second electric wires having a smaller outer diameter than the first electric wires and arranged between the pair of first electric wires in a circumferential direction, and the twist direction of the twisted-pair wire and the twist direction of the assembled article and the winding direction of the tape member are the same.

4. The cable according to claim 1, wherein the thickness of the tape member is not less than 0.028 mm and not more than 0.090 mm, and a width of the tape member is not less than 18 mm and not more than 35 mm.

5. The cable according to claim 1, wherein a tensile strength of the tape member is different between the longitudinal direction and the width direction and is smaller in the width direction than in the longitudinal direction.

6. The cable according to claim 1, wherein the tape member is spirally wound with an overlap of not less than ¼ and not more than ½ of the width thereof.

7. The cable according to claim 1, wherein the tape member is wound around the assembled article with an inclination angle of not less than 30° and not more than 60° with respect to the longitudinal direction of the cable.

8. The cable according to claim 1, further comprising an adhesive layer adhered to the surface of the tape member on the sheath side and thermally bonded to the sheath.

9. The cable according to claim 1, wherein the tape member is formed by laminating two or more layers of different materials in a thickness direction.

10. The cable according to claim 1, wherein the tape member comprises a nonwoven fabric of polyester, polypropylene, aramid fiber, nylon, acrylic fiber or glass fiber, and air permeability of the tape member is not less than 30 cc/cm$^2$/sec and not more than 200 cc/cm$^2$/sec.

11. The cable according to claim 1, wherein the tape member comprises paper.

12. The cable according to claim 1, wherein a resin constituting the sheath gets into microscopic recesses on the surface of the tape member on the sheath side.

13. The cable according to claim 5, wherein the tape member is configured so that the tensile strength in the width direction is not more than ⅔ of the tensile strength in the longitudinal direction.

14. The cable according to claim 8, wherein the adhesive layer is integrally provided on the tape member.

15. A wire harness, comprising:
    the cable according to claim 1; and
    a connector attached to at least one of end portions of the electric wires.

* * * * *